United States Patent
Wang

(10) Patent No.: US 9,835,846 B2
(45) Date of Patent: Dec. 5, 2017

(54) OCULAR LENS, HEADSET DISPLAY OPTICAL SYSTEM, AND HEADSET DEVICE

(71) Applicant: Beijing Pico Technology Co., Ltd., Hai Dian District (CN)

(72) Inventor: Yuanpeng Wang, Hai Dian District (CN)

(73) Assignee: Beijing Pico Technology Co., Ltd., Hai Dian District (CN)

(*) Notice: Subject to any disclaimer, the term of this patent is extended or adjusted under 35 U.S.C. 154(b) by 0 days.

(21) Appl. No.: 15/232,721

(22) Filed: Aug. 9, 2016

(65) Prior Publication Data

US 2017/0192220 A1 Jul. 6, 2017

(30) Foreign Application Priority Data

Dec. 31, 2015 (CN) .......................... 2015 1 1032019

(51) Int. Cl.
| | |
|---|---|
| *G02B 3/00* | (2006.01) |
| *G02B 25/00* | (2006.01) |
| *G02B 13/18* | (2006.01) |
| *G02B 9/02* | (2006.01) |
| *G02B 1/04* | (2006.01) |
| *G02B 5/00* | (2006.01) |

(52) U.S. Cl.
CPC ........... *G02B 25/001* (2013.01); *G02B 1/041* (2013.01); *G02B 5/005* (2013.01); *G02B 9/02* (2013.01); *G02B 13/18* (2013.01)

(58) Field of Classification Search
CPC .................................................. G02B 25/001
USPC ........................................................ 359/647
See application file for complete search history.

(56) References Cited

U.S. PATENT DOCUMENTS

| | | | | |
|---|---|---|---|---|
| 6,091,910 A | * | 7/2000 | Mihara | G03B 13/06 |
| | | | | 396/373 |
| 2003/0107822 A1 | | 6/2003 | Saito | |
| 2006/0030938 A1 | * | 2/2006 | Altmann | A61F 2/1602 |
| | | | | 623/6.37 |

FOREIGN PATENT DOCUMENTS

| | | |
|---|---|---|
| CN | 102313969 A | 1/2012 |
| CN | 205450452 U | 8/2016 |
| JP | 2006162829 A | 6/2006 |

OTHER PUBLICATIONS

Chinese Patent Office, First Office Action of CN 201511032019.5 dated May 31, 2017.

* cited by examiner

*Primary Examiner* — James Jones
(74) *Attorney, Agent, or Firm* — LKGLOBAL/Lorenz & Kopf, LLP; Seth E. Rodack

(57) ABSTRACT

An ocular lens uses a single positive lens having a first surface convex to a light emission direction and a second surface convex to a light incident direction. The surfaces are both aspherical and satisfy the following surface-type parameters and relationships: an absolute value of a radius of the first surface is r1, with a quadratic term coefficient being k1; an absolute value of a radius of the second surface is r2, with a quadratic term coefficient being k2; a thickness of the positive lens is d; a total focal length of the optical system corresponding to the positive lens is f; wherein, $49<r1<150$, $20<r2<40$, $0.3<r1/r2<0.45$; $-3<k1<-0.5$, $-3<k2<-0.5$; $33<f<40$; $0.45<f/r1<0.65$, $1.2<f/r2<1.8$, $2.6<f/d<3$.

8 Claims, 3 Drawing Sheets

OCULAR LENS, HEADSET DISPLAY OPTICAL SYSTEM, AND HEADSET DEVICE

CROSS-REFERENCE TO RELATED APPLICATIONS

This application claims priority to Chinese Application Number 201511032019.5 filed Dec. 31, 2015, which is incorporated herein by reference in its entirety.

TECHNICAL FIELD

The present invention relates to the field of lens designing, and more specifically relates to an ocular lens, a headset display optical system, and a headset device.

BACKGROUND

A headset display optical system is a display screen-based image magnifying system. An image generated by the display screen is magnified by the optical system to present a virtual image at a certain distance from human eyes, such that a user may be totally immersed in a virtual scene, free from interference from external information. In many application fields, users of headset display optical systems work in mobility. This requires that the optical systems should be compact in structure and light in weight while guaranteeing imaging quality, and meanwhile should have a relatively large FoV (field of view).

A challenge for designing a headset display optical system is that increase of a focal power of the optical system will cause increase of surface-type curvature of the lens, and glass will become increasingly bulged, which increases weight of the headset display optical system and accordingly optical aberration.

Therefore, it is an imminent problem to be solved in current development of headset display optical systems as to how to solve a conflict between focal power and lightweight of a headset display optical system.

In addition, other objects, desirable features and characteristics will become apparent from the subsequent summary and detailed description, and the appended claims, taken in conjunction with the accompanying drawings and this background.

SUMMARY

In view of the above, the present invention provides an ocular lens, a headset display optical system, and a headset device, so as to solve or partially solve the problems above.

In order to achieve the above objective, a technical solution of the present invention is implemented as follows:

On one hand, the present invention provides an ocular lens that uses a single positive lens, the positive lens having a first surface convex to a light emission direction and a second surface convex to a light incident direction, the first surface and the second surface are both aspherical and satisfy the following surface-type parameters and relationships:

an absolute value of a radius of the first surface is r1, with a quadratic term coefficient being k1; an absolute value of a radius of the second surface is r2, with a quadratic term coefficient being k2; a thickness of the positive lens is d; a total focal length of the optical system corresponding to the positive lens is f; wherein,
$49 < r1 < 150$, $20 < r2 < 40$, $0.3 < r1/r2 < 0.45$;
$-3 < k1 < -0.5$, $-3 < k2 < -0.5$;
$33 < f < 40$;
$0.45 < f/r1 < 0.65$, $1.2 < f/r2 < 1.8$, $2.6 < f/d < 3$.

Preferably, a back focal length of the optical system corresponding to the positive lens is L, $23 < L < 34$.

Preferably, the positive lens has a refractive index in a range of $1.45 < n < 1.70$, and a dispersion in a range of $50 < v < 75$.

Further preferably, the positive lens uses a K26r-model Cyclo Olefin Polymer(COP).

Further preferably, the positive lens has a refractive index of $n=1.535$, with a dispersion $v=56$.

In another aspect, the present invention provides a headset display optical system, the headset display optical system comprises in succession reverse to a light incident direction: an optical diaphragm, an ocular lens provided in the solution above, and a display screen.

Preferably, the optical diaphragm is located at a pupil of a human eye.

In a further aspect, the present invention provides a headset device, comprising a headset display optical system provided in the solution above.

The technical solutions provided by the present invention have the following advantageous effects: 1. An ocular lens using a single positive lens has a simple structure, a small size, and a light weight, which thus alleviates user burden; 2. By reasonably configuring surface-type parameters of the positive lens and relationships between respective surface-type parameters, a large FoV (Field of View) angle of 96° is obtained, which effectively balances the requirements between FoV angle and lightweight of the headset display optical system; 3. By using an ocular lens with aspherical plastic lens, the cost is lowered, which facilitates batch production.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Embodiment 1

Figure 1:
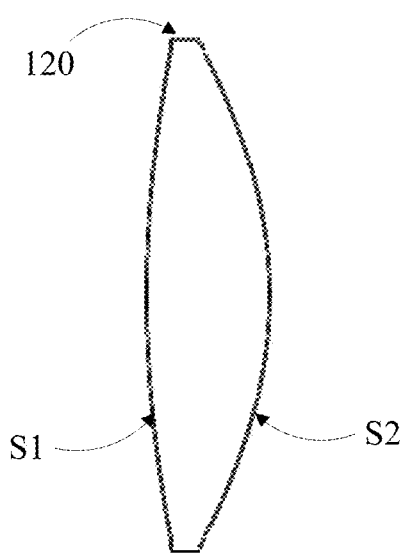
FIG. 1 shows a schematic diagram of an ocular lens provided according to an embodiment of the present invention.

FIG. 1 shows a schematic diagram of an ocular lens provided in the present embodiment. As shown in FIG. 1, the ocular lens 120 uses a single positive lens 121, the positive lens 121 having a first surface S1 convex to a light emission direction and a second surface S2 convex to a light incident direction, the first surface S1 and the second surface S2 being both aspherical and satisfying the following surface-type parameters and relationships:

an absolute value of a radius of the first surface S1 is r1, with a quadratic term coefficient being k1; an absolute value of a radius of the second surface S2 is r2, with a quadratic term coefficient being k2; a thickness of the positive lens 121 is d; a total focal length of the optical system corresponding to the positive lens 121 is f; a back focal length of the optical system corresponding to the positive lens 121 is L; wherein, $49<r1<150$, $20<r2<40$, $0.3<r1/r2<0.45$;
$-3<k1<-0.5$, $-3<k2<-0.5$;
$33<f<40$;
$0.45<f/r1<0.65$, $1.2<f/r2<1.8$, $2.6<f/d<3$;
$23<L<34$.

In the present embodiment, the positive lens 121 has a refractive index in a range of $1.45<n<1.70$, and a dispersion in a range of $50<v<75$. Because a plastic material is relatively economical, light-weighted, and easily processed into an aspherical model, the present embodiment preferably employs a K26r model-COP (Cyclo Olefin Polymers), with a refractive index of $n=1.535$ and a dispersion of $v=56$.

Wherein, the COP is a kind of non-crystalline thermoplastics, i.e., a non-crystalline transparent copolymer having a cyclo olefin structure.

The ocular lens according to the present embodiment employs a very simple structure, i.e., only formed by a single positive lens. Two effective light transmission surfaces of the positive lens are both aspherical; the two surfaces are easily processing formed; meanwhile, the weight and cost are very low, and thus suitable for batch production; moreover, by reasonably setting surface-type parameters of the two surfaces and the relationships between respective parameters, the optical system formed by the single positive lens can obtain a large FoV angle of 96°.

Embodiment 2

Figure 2:
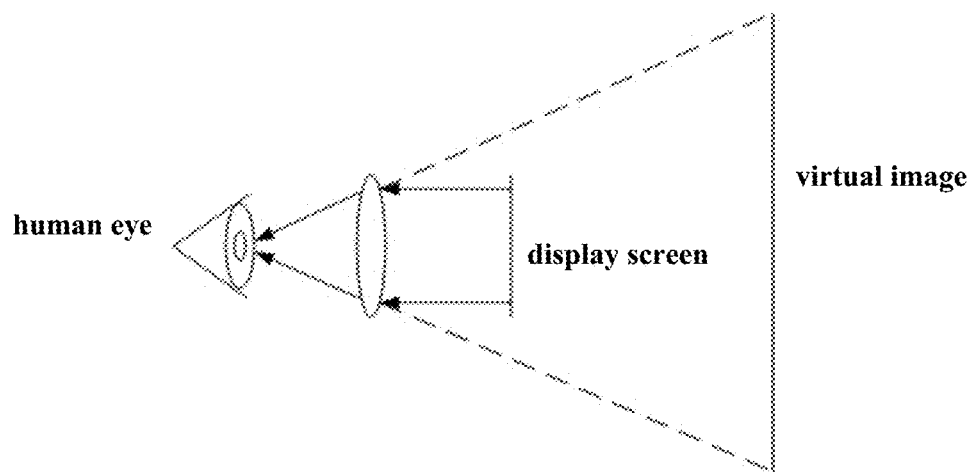
FIG. 2 shows schematic diagram of a working principle of a headset display optical system.

FIG. 2 shows a schematic diagram of a working principle of a headset display optical system according to an embodiment of the present invention. As shown in FIG. 2, light ray, after being emitted from the display screen and imaged through the ocular lens, forms a giant virtual image 2 meters away before human eyes. What is seen by human eyes is the virtual image. The optical system functions like a magnifying glass, with a purpose of magnifying the information on the display screen, and then forms a virtual image distantly, such that the user may be fully immersed into the virtual scene, free from interference from external information.

Figure 3:
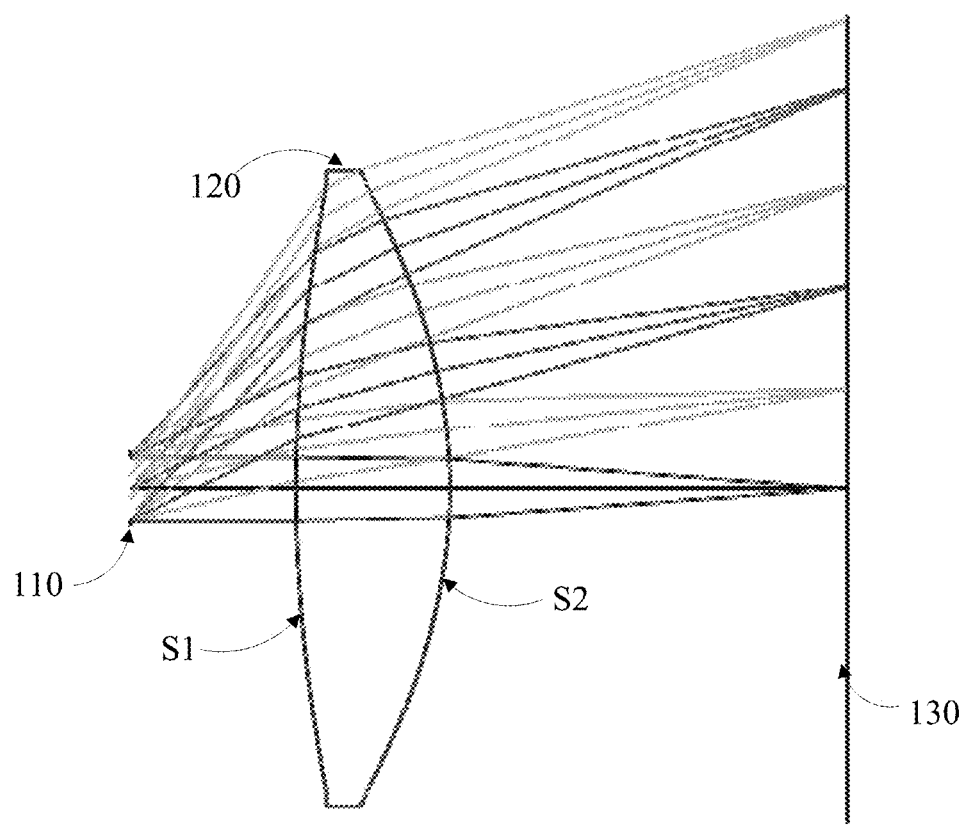
FIG. 3 shows a schematic diagram of a headset display optical system provided according to an embodiment of the present invention.

FIG. 3 shows a schematic diagram of a headset display optical system provided according to the present embodiment. As shown in FIG. 3, the headset display optical system includes in succession reverse to a light incident direction: an optical diaphragm 110, an ocular lens 120, and a display screen 130.

The present system employs a reversed-chasing optical path design. In FIG. 3, the image surface position is the display screen 130; the object surface position is a virtual image generated by the ocular lens 120; the optic diaphragm 110 is located at a human pupil; and the positive lens 121 converges diffused off-axis principal ray.

The ocular lens 120 of the headset display optical system according to the present embodiment is the ocular lens according to Embodiment 1, which will not be detailed here.

In the present embodiment, the display screen 130 may employ a 5-6-inch LCD display screen.

Based on respective parameters above, the headset display optical system achieves a FoV angle of 96°. When a user of the headset display optical system puts his/her eyes at the position of the optical diaphragm 110, the light emitted by the display screen 130, after passing through the ocular lens 120, forms a magnified virtual image 2 m away in front of his/her eyes.

Figure 4:
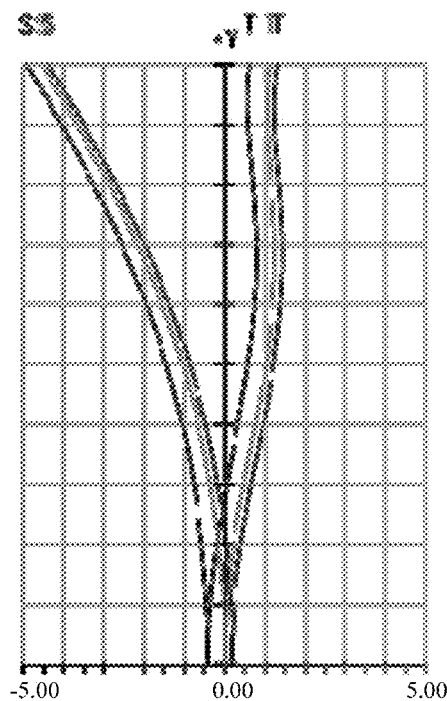
FIG. 4 shows a field-curvature graph of a headset display optical system provided according to an embodiment of the present invention.
Figure 5:
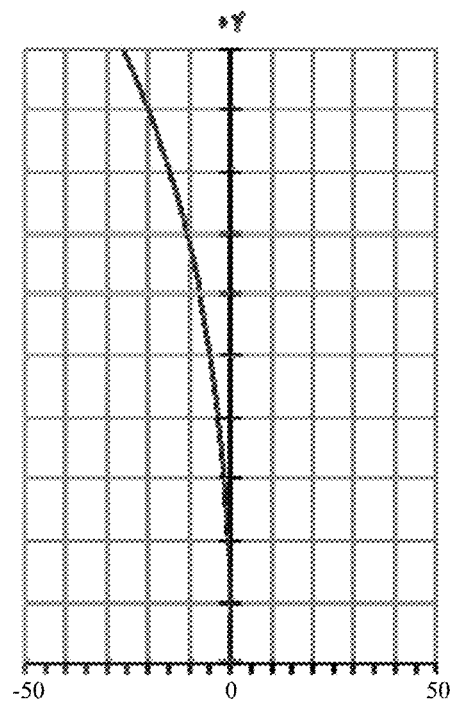
FIG. 5 shows a distortion graph of a headset display optical system provided according to an embodiment of the present invention.

FIGS. 4 and 5 show field curvature and distortion graphs of a headset display optical system according to the present embodiment, wherein FIG. 4 shows field curvature, and FIG. 5 shows distortion.

Field curvature refers to an aberration resulting from forming a curved surface image by an object plane, which needs to be wherein by a meridian field curvature and a sagittal field curvature. As shown in FIG. 4, in the field curvature, T line refers to the meridian field curvature, while S line refers to the sagittal field curvature, and their difference is just an astigmatism of the optical system; field curvature and astigmatism are important aberrations that affect the off-axis FoV ray of the optical system. If they are too large, imaging quality of the off-axis ray of the optical system will be seriously affected. It may be seen that the field curvature and the astigmatism of the optical system are both corrected to an extremely small range.

Distortion does not affect definition of the optical system, but will cause image distortion of the system. For a wide-angle lens, distortion correction is very difficult, which may be resolved by later imaging processing.

Figure 6:
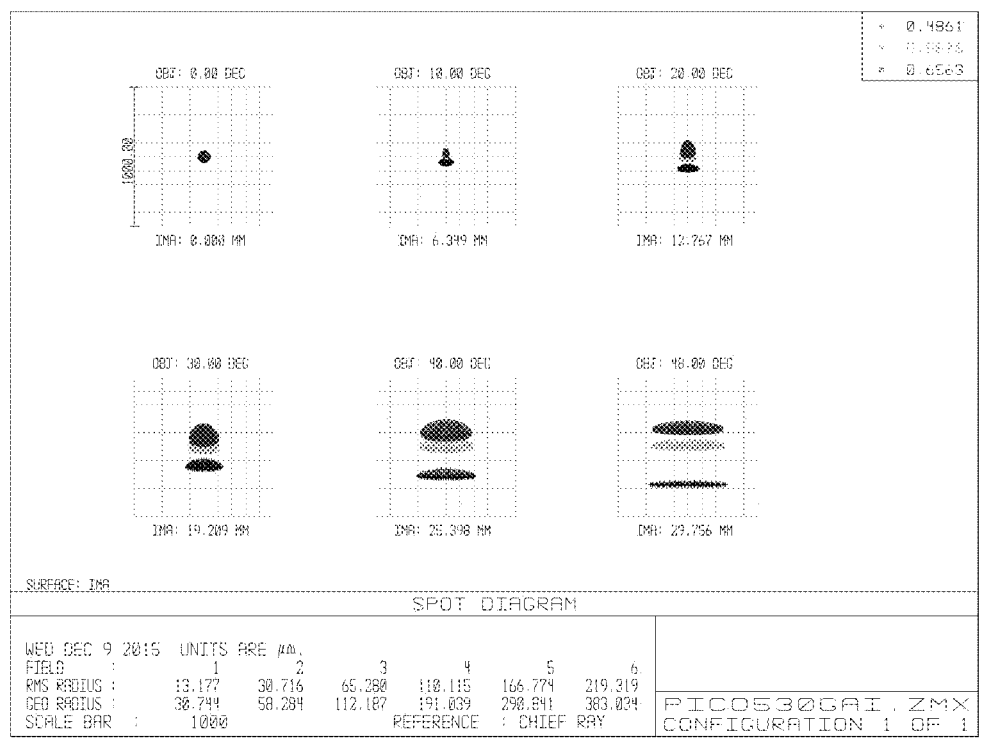
FIG. 6 shows a spot diagram of a headset display optical system provided according to an embodiment of the present invention.

FIG. 6 shows a spot diagram of a headset display optical system according to the present embodiment. The spot diagram ignores a diffraction effect, but reflects a geological structure of optical system imaging. In a spot diagram of a large-aberration system, distribution of dots can approximately represent energy distribution of point images. Therefore, when evaluating image quality, a dense degree of the spot diagram may be used to reflect and weigh the quality of system imaging more directly. The smaller the RMS radius of the spot diagram is, the better the imaging quality of the system is proved. As shown in FIG. 6, the radius of the spot diagram RMS of the headset optical system is less than 220 μm; it is seen that the speckles of respective FoVs are relatively small, indicating that the energy distribution of the system is well optimized, and the aberration correction is good.

Embodiment 3

Based on a same technical idea as the headset display optical system of Embodiment 2, the present embodiment provides a headset device that comprises a headset display optical system in Embodiment 2.

In view of the above, the present invention provides an ocular lens, a headset display optical system, and a headset device. By reasonably configuring surface-type parameters of the positive lens of the ocular lens, a light-weighted headset display optical system with a large FoV is implemented. Compared with the prior art, the present invention has the following advantageous effects: 1. An ocular lens using a single positive lens has a simple structure, a small size, and a light weight, and thus alleviates user burden; 2. By reasonably configuring surface-type parameters of the positive lens and relationships between respective surface-type parameters, a large FoV of 96° is obtained, which effectively balances the requirements between FoV and lightweight of the headset display optical system; 3. By using an ocular lens with aspherical plastic lens, the cost is lowered, which facilitates batch production.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An ocular lens that uses a single positive lens, the positive lens having a first surface convex to a light emission direction and a second surface convex to a light incident direction, wherein the first surface and the second surface are both aspherical and satisfy the following surface-type parameters and relationships:

an absolute value of a radius of the first surface is r1, with a quadratic term coefficient being k1; an absolute value of a radius of the second surface is r2, with a quadratic term coefficient being k2; a thickness of the positive lens is d; a total focal length of the optical system corresponding to the positive lens is f; wherein, 49<r1<150, 20<r2<40, 0.3<r1/r2<0.45;
−3<k1<−0.5, −3<k2<−0.5;
33<f<40;
0.45<f/r1<0.65, 1.2<f/r2<1.8, 2.6<f/d<3.

2. The ocular lens according to claim 1, wherein a back focal length of the optical system corresponding to the positive lens is L, 23<L<34.

3. The ocular lens according to claim 1, wherein the positive lens has a refractive index in a range of 1.45<n<1.70, and a dispersion in a range of 50<v<75.

4. The ocular lens according to claim 3, wherein the positive lens uses a K26r-model Cyclo Olefin Polymer.

5. The ocular lens according to claim 4, wherein the positive lens has a refractive index of n=1.535, with a dispersion of v=56.

6. A headset display optical system, comprising in succession reverse to a light incident direction: an optical diaphragm, an ocular lens according to claim 1, and a display screen.

7. The headset display optical system according to claim 6, wherein the optical diaphragm is located at a pupil of a human eye.

8. A headset device, comprising a headset display optical system according to claim 7.

* * * * *